US011962408B2

(12) United States Patent
Shinohara et al.

(10) Patent No.: US 11,962,408 B2
(45) Date of Patent: Apr. 16, 2024

(54) WIRELESS COMMUNICATION SYSTEM, AND WIRELESS COMMUNICATION METHOD

(71) Applicant: Nippon Telegraph and Telephone Corporation, Tokyo (JP)

(72) Inventors: Shoko Shinohara, Musashino (JP); Yasuhiko Inoue, Musashino (JP); Takafumi Hayashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 393 days.

(21) Appl. No.: 17/434,605

(22) PCT Filed: Feb. 25, 2020

(86) PCT No.: PCT/JP2020/007473
§ 371 (c)(1),
(2) Date: Aug. 27, 2021

(87) PCT Pub. No.: WO2020/179543
PCT Pub. Date: Sep. 10, 2020

(65) Prior Publication Data
US 2022/0149983 A1 May 12, 2022

(30) Foreign Application Priority Data
Mar. 4, 2019 (JP) ................................. 2019-039044

(51) Int. Cl.
*H04L 1/00* (2006.01)
*H04W 28/06* (2009.01)

(52) U.S. Cl.
CPC ........... *H04L 1/0045* (2013.01); *H04W 28/06* (2013.01)

(58) Field of Classification Search
CPC ... H04L 1/0057; H04L 1/0009; H04L 1/0061; H04W 72/0446; H04W 72/0453; H04W 28/04; H04W 28/10
See application file for complete search history.

(56) References Cited

U.S. PATENT DOCUMENTS

| | | |
|---|---|---|
| 2005/0160346 A1 | 6/2005 | Yamane |
| 2007/0076708 A1 | 4/2007 | Kolakowski et al. |
| 2018/0167621 A1 | 6/2018 | Sato |

FOREIGN PATENT DOCUMENTS

| | | |
|---|---|---|
| JP | 2003037606 | 2/2003 |
| JP | 2005175837 | 6/2005 |

(Continued)

OTHER PUBLICATIONS

[No Author Listed], "Part 11: Wireless LAN Medium Access Control (MAC) and Physical Layer (PHY) Specifications," IEEE Std 802.11-2016 IEEE Standard for Information Technology—Telecommunications and Information Exchange between Systems Local and Metropolitan Area Networks-specific requirements, Dec. 2016, 3534 pages.

(Continued)

*Primary Examiner* — Khalid W Shaheed
(74) *Attorney, Agent, or Firm* — Fish & Richardson P.C.

(57) ABSTRACT

Provided is a wireless communication system that includes a transmission device configured to receive an input of group-addressed data transmitted from a specific source, convert the group-addressed data into wireless frames, and perform group-addressed transmission of the wireless frames; and a reception device configured to receive the wireless frames transmitted from the transmission device, and identify and acquire the group-addressed data of the specific source. The transmission device includes coding means for defining a plurality of wireless frames as a frame block, performing error correction coding on the frame (Continued)

block, and performing group-addressed transmission of the frame block, and the reception device includes decoding means for identifying the frame block from the received wireless frames, performing error correction decoding in units of frame block, and reconfiguring the group-addressed data of the specific source.

4 Claims, 9 Drawing Sheets

(56) References Cited

FOREIGN PATENT DOCUMENTS

| JP | 2011114485 | 6/2011 |
|---|---|---|
| WO | WO 2016203870 | 12/2016 |

OTHER PUBLICATIONS

Fujisawa et al., "Estimation of multicast packet loss characteristic due to collision and loss recovery using FEC on distributed infrastructure wireless LANs," NHK Science & Technical Research Laboratories R&D, 2005, 90:56-65, 21 pages (with English translation).

WIRELESS COMMUNICATION SYSTEM, AND WIRELESS COMMUNICATION METHOD

CROSS-REFERENCE TO RELATED APPLICATIONS

This application is a National Stage application under 35 U.S.C. § 371 of International Application No. PCT/JP2020/007473, having an International Filing Date of Feb. 25, 2020, which claims priority to Japanese Application Serial No. 2019-039044, filed on Mar. 4, 2019. The disclosure of the prior application is considered part of the disclosure of this application, and is incorporated in its entirety into this application.

TECHNICAL FIELD

The present invention relates to a wireless communication system and a wireless communication method that perform a group-addressed service using broadcast communication or multicast communication.

BACKGROUND ART

A wireless LAN system conforming to the IEEE 802.11 standard (NPL 1) is an example of a currently most popular wireless communication system that performs autonomous distributed access control.

Typically, group-addressed services include broadcast services and multicast services. In IEEE 802.11 wireless LAN systems, handling of data with a group address, that is, data whose destination is a plurality of terminals is defined. In the IEEE 802.11 standard, "10.3.6 Group addressed MPDU transfer procedure" defines a rule regarding a basic procedure of transferring group-addressed data, and "11.2 Power management" defines a rule regarding a data forwarding procedure when a terminal device is operating in a power save mode.

FIG. 8 shows a data forwarding procedure of typical unicast data transmission in the IEEE 802.11 standard. "AP" transmits unicast data in accordance with an access control procedure, and "STA" returns an ACK upon correctly receiving the unicast data.

FIG. 9 shows a procedure for transmitting group-addressed data (broadcast data/multicast data) in the IEEE 802.11 standard. "AP" transmits the group-addressed data in accordance with an access control procedure similar to that when transmitting unicast data. However, "STAs" do not return an ACK even upon correctly receiving the group-addressed data. This is because due to a plurality of destinations being present in group-addressed data transmission, a collision may occur if the respective "STAs" return ACKs. Accordingly, the broadcast/multicast communication does not include a procedure of returning a response after the transmission of data, and thus has low communication quality and reliability as compared to unicast communication.

CITATION LIST

Non Patent Literature

[NPL 1] IEEE Std 802.11-2016

SUMMARY OF THE INVENTION

Technical Problem

If group addressed communication (broadcast/multicast communication) is performed only unidirectionally, no response frame is transmitted from a communication partner, which serves as a destination, in contrast to a case where bi-directional communication is performed, and thus it is not possible to acquire feedback information regarding as to whether or not the communication was successful, regarding the current communication quality, or the like. Accordingly, there are currently problems that even when wireless frames are transmitted, frame errors frequently occur and content cannot be received correctly due to a poor communication environment such as a propagation path, or a low speed rate is used more than necessary in order to inversely reduce the frame error rate, causing a reduction in the capacity.

An object of the present invention is to provide a wireless communication system and a wireless communication method that can increase, in group addressed communication, the communication quality and reliability even in unidirectional communication.

Means for Solving the Problem

A first invention relates to a wireless communication system including:
a transmission device configured to receive an input of group-addressed data transmitted from a specific source, convert the group-addressed data into wireless frames, and perform group-addressed transmission of the wireless frames; and
a reception device configured to receive the wireless frames transmitted from the transmission device, and identify and acquire the group-addressed data of the specific source,
wherein the transmission device includes coding means for defining a plurality of wireless frames as a frame block, performing error correction coding on the frame block, and performing group-addressed transmission of the frame block, and
the reception device includes decoding means for identifying the frame block from the received wireless frames, performing error correction decoding in units of frame block, and reconfiguring the group-addressed data of the specific source.

In the wireless communication system according to the first invention, an identifier that indicates the group-addressed data transmitted from the specific source, and an identifier indicating that error correction coding has been performed in units of frame block are added to the wireless frame to be subjected to the group-addressed transmission by the transmission device, and the reception device uses the identifiers to decode the frame block and identify the group-addressed data of the specific source.

In the wireless communication system according to the first invention, the transmission device includes, in addition to the coding means, copying means for copying the frame block subjected to the error correction coding and performing group-addressed transmission of the copy of the frame block, and the reception device includes, in addition to the decoding means, combining means for receiving the frame block and the copy of the frame block and combining the frame block subjected to the error correction decoding and the copy of the frame block.

A second invention relates to a wireless communication method in which a transmission device receives an input of group-addressed data transmitted from a specific source, converts the group-addressed data into wireless frames, and performs group-addressed transmission of the wireless frames; and a reception device receives the wireless frames transmitted from the transmission device, and identifies and acquires the group-addressed data of the specific source, wherein the transmission device executes a coding step of defining a plurality of wireless frames as a frame block, performing error correction coding on the frame block, and performing group-addressed transmission of the frame block, and the reception device executes a decoding step of identifying the frame block from the received wireless frames, performing error correction decoding in units of frame block, and reconfiguring the group-addressed data of the specific source.

In the wireless communication method according to the second invention, an identifier that indicates the group-addressed data transmitted from the specific source, and an identifier indicating that error correction coding has been performed in units of frame block are added to the wireless frame to be subjected to the group-addressed transmission by the transmission device, and the reception device uses the identifiers to decode the frame block and identify the group-addressed data of the specific source.

In the wireless communication method according to the second invention, the transmission device executes, in addition to the coding step, a copying step of copying the frame block subjected to the error correction coding and performing group-addressed transmission of the copy of the frame block, and the reception device executes, in addition to the decoding step, a combining step of receiving the frame block and the copy of the frame block and combining the frame block subjected to the error correction decoding and the copy of the frame block.

Effects of the Invention

According to the present invention, group-addressed data from a specific source is subjected to error correction coding in units of frame block and to group-addressed transmission, and a reception device subjects received wireless frames to error correction decoding in units of frame block, thereby making it possible to increase the communication quality of the received data.

DESCRIPTION OF EMBODIMENTS

Embodiment 1

Figure 1:
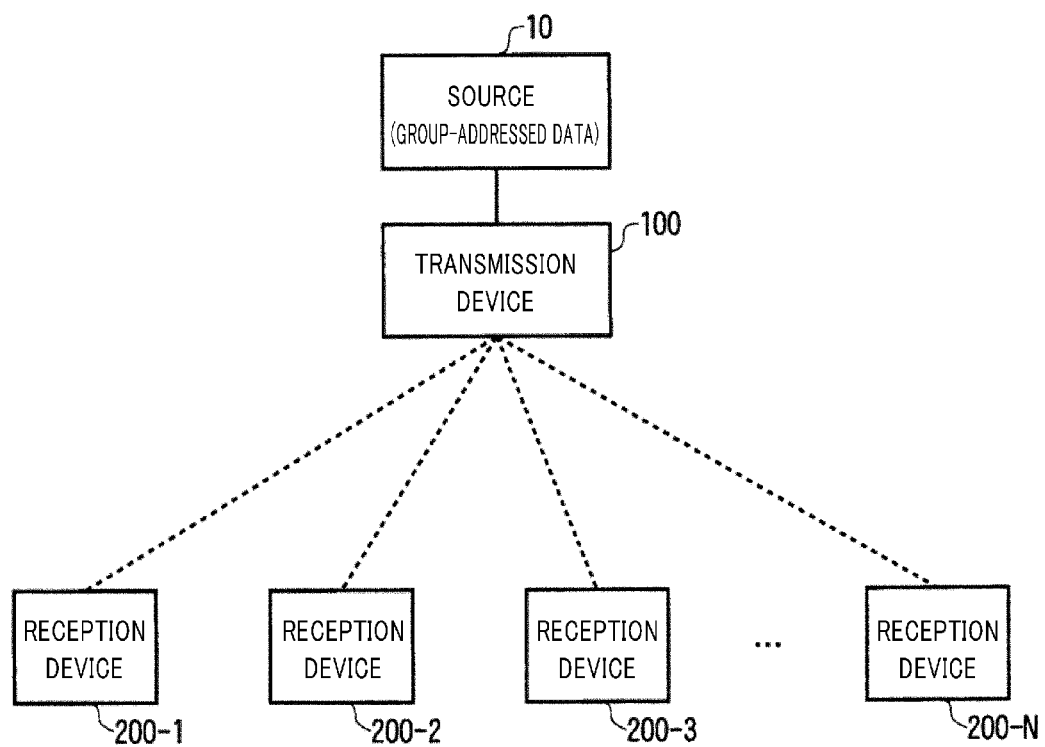
FIG. 1 is a diagram illustrating a configuration of Embodiment 1 of a wireless communication system of the present invention.

FIG. 1 shows a configuration of Embodiment 1 of a wireless communication system of the present invention.

In FIG. 1, upon input of group-addressed data transmitted from a specific source 10 such as a content server for example, a transmission device 100 convert the group-addressed data into wireless frames and perform group addressed transmission of the converted wireless frames toward reception devices 200-1 to 200-N. Reception devices designated by a group address receive the group-addressed data.

Figure 2:
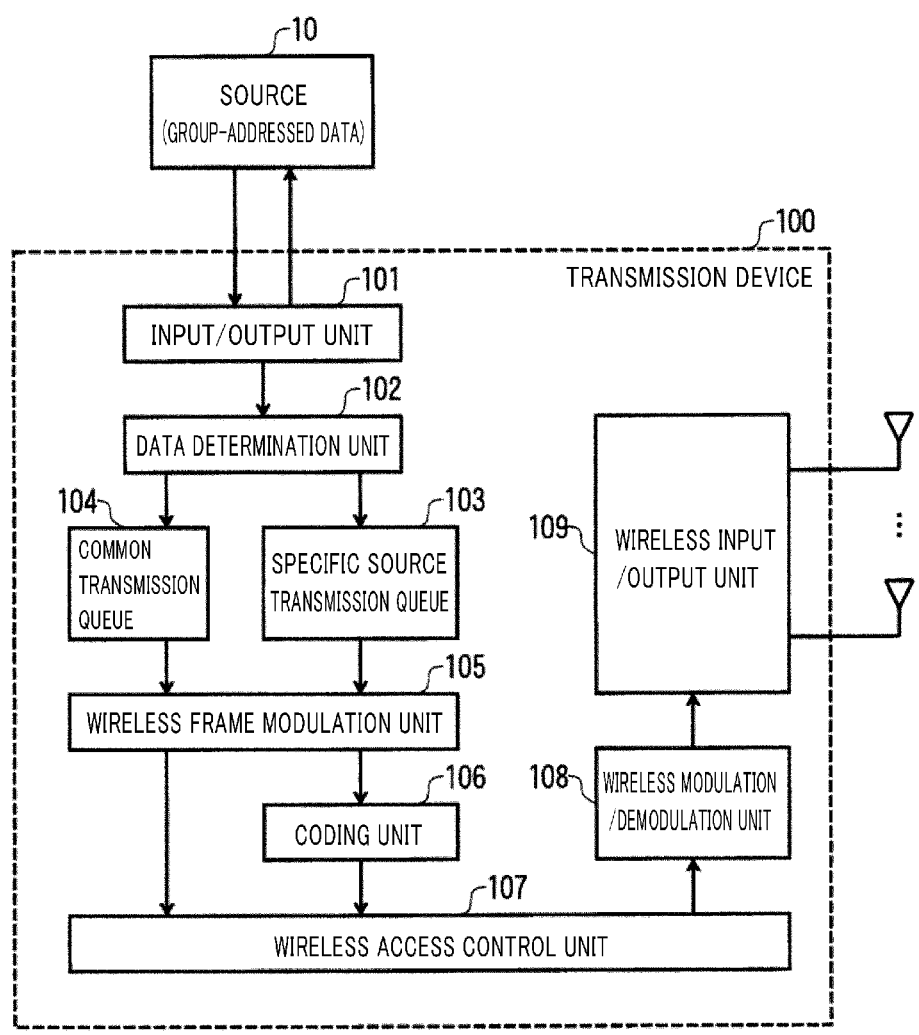
FIG. 2 is a diagram illustrating a configuration of Embodiment 1 of a transmission device 100.

FIG. 2 shows a configuration of Embodiment 1 of the transmission device 100.

In FIG. 2, an input/output unit 101 of the transmission device 100 outputs data forwarded from the upstream device to a data determination unit 102. The data determination unit 102 determines the input data, and if the input data is the group-addressed data transmitted from the specific source 10, the data determination unit 102 outputs the input data to a specific source transmission queue 103. If the input data is data other than the above-described group-addressed data, the data determination unit 102 outputs the input data to a common transmission queue 104. Note that if the transmission device 100 always receives only group-addressed data from the specific source 10 (for example, if the transmission device 100 is a transmission device for exclusive use in broadcast), the data determination unit 102 and the common transmission queue 104 are unnecessary.

Figure 4:
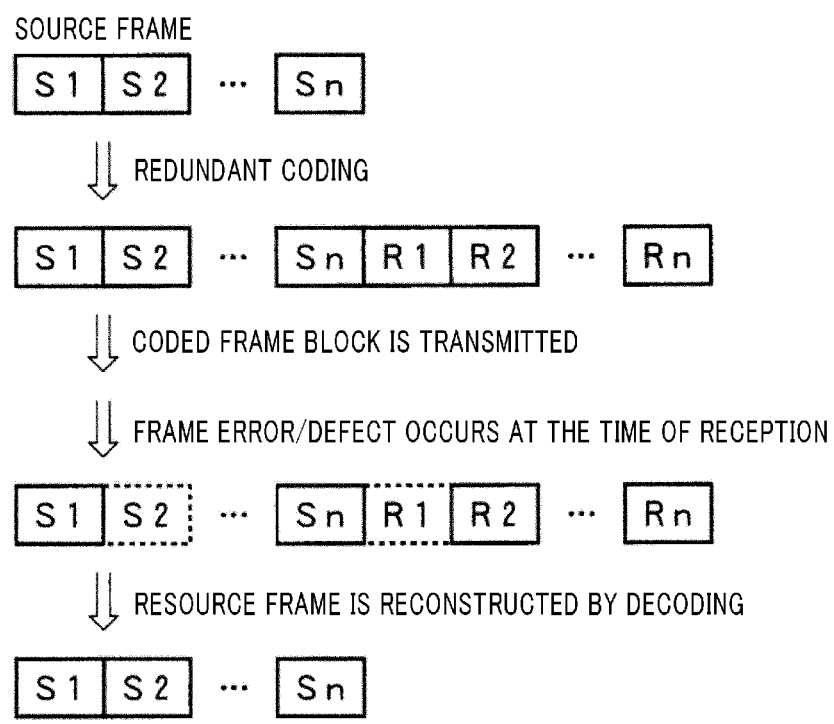
FIG. 4 is a diagram illustrating error correction coding based on LDPC.

A wireless frame modulation unit 105 modulates the group-addressed data stored in the specific source transmission queue 103 according to a wireless frame format. A coding unit 106 defines a plurality of wireless frames as one block (frame block), and performs error correction coding on the frame block. For example, in error correction coding based on LDPC (Low-Density Parity Check) shown in FIG. 4, the coding unit 106 performs redundant coding on source frames S1 to Sn to generate repair frames R1 to Rn, and transmits the frame block. The source frames S1 to Sn can be reconstructed by receiving all frames of the frame block and performing error correction decoding thereon even if an error or a defect occurs in some of the source frames or the repair frames at the time of reception.

When a wireless access control unit 107 has acquired a transmission right through an accessing procedure that corresponds to each queue using CSMA/CA or the like, the group-addressed data stored in the specific source transmission queue 103 is transmitted, as a frame block generated by the coding unit 106, via a wireless modulation/demodulation unit 108 and a wireless input/output unit 109.

Here, a source ID that indicates the specific source 10 is added to the group-addressed data. For example, the source ID is stored in a source address (Address 3 in FIG. 7) of a wireless frame in which the group-addressed data is stored. Furthermore, a specific bit sequence that indicates that coding for each frame block has been performed is set in "Frame Body" of the wireless frame. Also, on the reception side, the wireless frame is identified as a group-addressed frame based on the source ID, and as a result of the specific bit sequence being read, it is recognized that error correction coding has been performed on the frame block.

Figure 3:
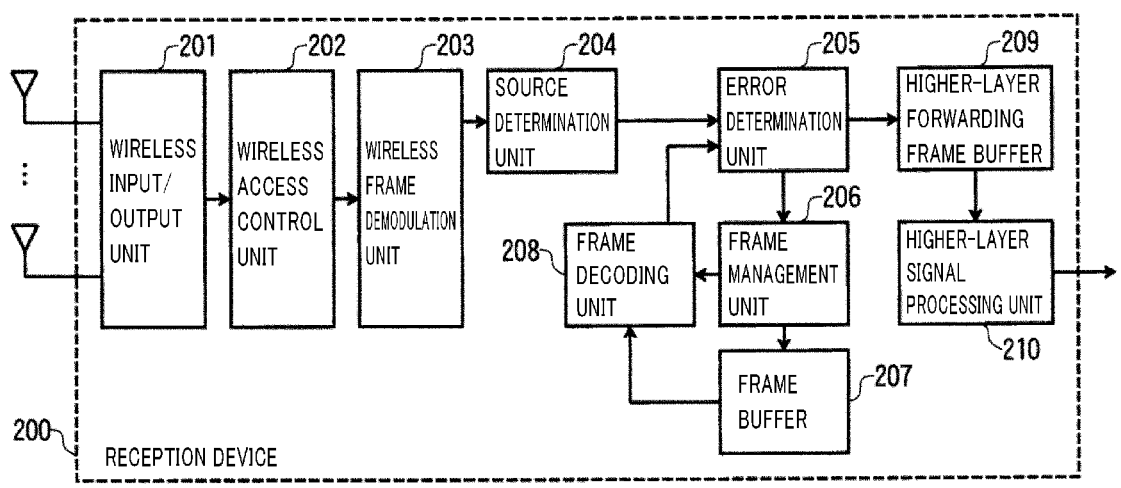
FIG. 3 is a diagram illustrating a configuration of Embodiment 1 of a reception device 200.

FIG. 3 shows a configuration of Embodiment 1 of a reception device 200.

In FIG. 3, a wireless input/output unit 201 of the reception device 200 receives a wireless frame, and a wireless access control unit 202 determines whether or not to start reception processing. Note that the wireless access control unit 202 has, in addition thereto, functions such as sensing a carrier in an unlicensed band, and the like, but such functions are not directly relevant to the present invention itself. Accordingly, details thereof are omitted.

A wireless frame demodulation unit 203 demodulates the received wireless frame and outputs the demodulated wireless frame to a source determination unit 204. Based on the source ID of header information or Frame Body information of the demodulated data frame, the source determination unit 204 determines whether or not this data frame is a group-addressed frame from the specific source. If this data frame is not a group-addressed frame from the specific source, the data frame will be processed as a common data frame. A description thereof is omitted.

If it is determined that the received data frame is a group-addressed frame transmitted from the specific source, the source determination unit 204 outputs the group-addressed frame to an error determination unit 205. The error determination unit 205 determines whether or not the group-addressed frame has an error based on, for example, an FCS (Frame Check Sequence) of the group-addressed frame, and if no error is detected, the error determination unit 205 outputs this group-addressed frame to a frame management unit 206. The frame management unit 206 reads the specific bit sequence, and if it is recognized that this group-addressed frame is one of the frames of the frame block subjected to the error correction coding, the frame management unit 206 accumulates the group-addressed frame in a frame buffer 207 until the reception of frames necessary for error correction decoding of the frame block is complete.

If an error in the group-addressed frame is detected, the error determination unit 205 also outputs this group-addressed frame to the frame management unit 206. The frame management unit 206 records an identifier of the group-addressed frame such as a sequence number or a frame number, and stores the group-addressed frame in the frame buffer 207. The group-addressed frame stored in the frame buffer 207 is kept for a predetermined period of time until the reception of the frames of the same frame block is complete or is assumed to be complete.

Then, if a group-addressed frame that has the same source ID and the specific bit sequence corresponding to the frame block is input to the reception device 200, this group-addressed frame is input to the frame management unit 206 via the wireless input/output unit 201, the wireless access control unit 202, the wireless frame demodulation unit 203, the source determination unit 204, and the error determination unit 205, as with the previous group-addressed frame. The group-addressed frame is accumulated in the frame buffer 207 until the reception of frames necessary for error correction decoding of the frame block is complete.

Also, when the state is reached in which error correction decoding of the frame block is possible, the frame management unit 206 reads the frame block from the frame buffer 207 and outputs the read frame block to a frame decoding unit 208. The frame decoding unit 208 then performs error correction decoding processing on the frame block. The frame block decoded by the frame decoding unit 208 is output to a higher-layer forwarding frame buffer 209 via the error determination unit 205, where it is subjected to buffering such that the frame numbers is not changed with respect to the numerical order, and is then forwarded to a higher layer via a higher-layer signal processing unit 210.

Embodiment 2

Upon input of group-addressed data transmitted from the specific source 10, the transmission device 100 of a wireless communication system according to Embodiment 2 converts the group-addressed data into wireless frames, performs group-addressed transmission of the converted wireless frames toward the reception devices 200-1 to 200-N, and then performs again group-addressed transmission of a copy of the wireless frames. Also, reception devices designated by the group address receive the wireless frames and the copy thereof.

Figure 5:
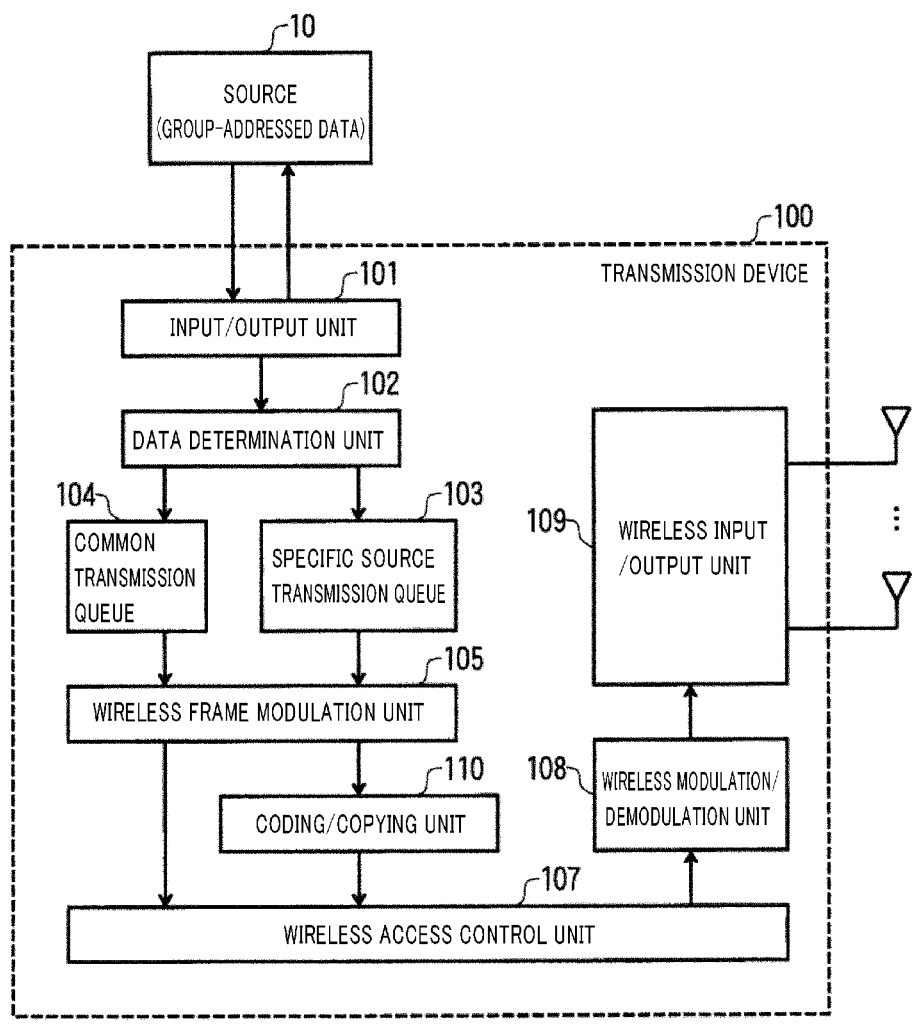
FIG. 5 is a diagram illustrating a configuration of Embodiment 2 of the transmission device 100.

FIG. 5 shows a configuration of Embodiment 2 of the transmission device 100.

In FIG. 5, the input/output unit 101 of the transmission device 100 outputs data forwarded from the upstream device to the data determination unit 102. The data determination unit 102 determines the input data, and if the input data is the group-addressed data transmitted from the specific source 10, the data determination unit 102 outputs the input data to the specific source transmission queue 103. If the input data is data other than the above-described group-addressed data, the data determination unit 102 outputs the input data to the common transmission queue 104.

The wireless frame modulation unit 105 modulates the group-addressed data stored in the specific source transmission queue 103 according to a wireless frame format. A coding/copying unit 110 defines a plurality of wireless frames as one block (frame block) and performs error correction coding on the frame block, as in Embodiment 1, and generates a copy in units of frame block.

When the wireless access control unit 107 has acquired the transmission right through an accessing procedure that corresponds to each queue using CSMA/CA or the like, the group-addressed data stored in the specific source transmission queue 103 is transmitted, as the frame block and the copy thereof that are generated by the coding/copying unit 110, via the wireless modulation/demodulation unit 108 and the wireless input/output unit 109.

Here, the same source ID and the same specific bit sequence indicating that coding for each frame block has been performed are also set in the copy frames.

Figure 6:
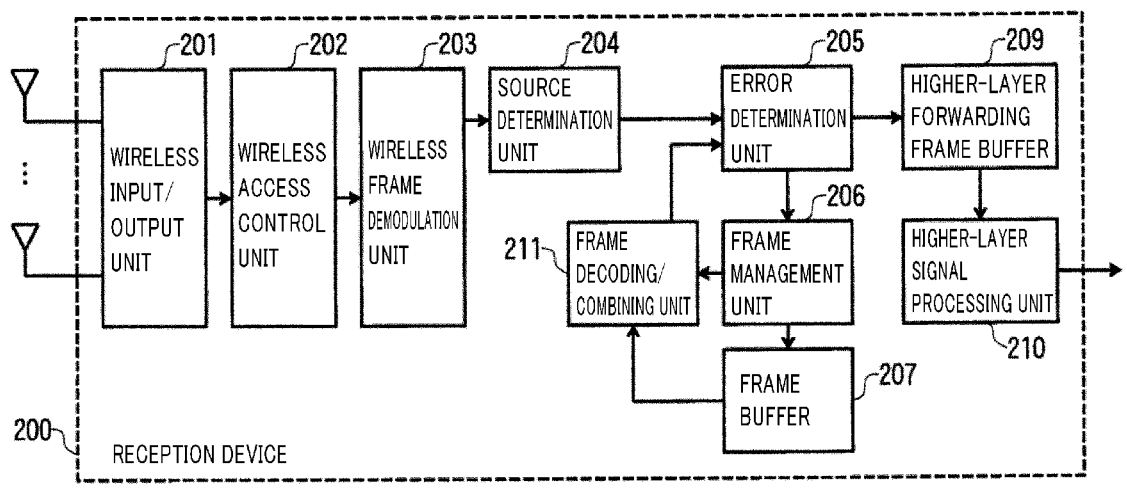
FIG. 6 is a diagram illustrating a configuration of Embodiment 2 of the reception device 200.

FIG. 6 shows a configuration of Embodiment 2 of the reception device 200.

In FIG. 6, processing that is performed by the wireless input/output unit 201 to the source determination unit 204 of the reception device 200 is the same as that of Embodiment 1. Also, processing on a frame block and processing on a copy thereof that are performed by the error determination unit 205 to a frame decoding/combining unit 211 are the same as those of Embodiment 1. Here, the frame decoding/ combining unit 211 is a functional unit provided instead of the frame decoding unit 208 of Embodiment 1.

When the state is reached in which error correction decoding is possible, the frame management unit 206 reads the frame block from the frame buffer 207 and outputs the read frame block to the frame decoding/combining unit 211. The frame decoding/combining unit 211 then performs error correction decoding processing on the frame block. The frame block decoded by the frame decoding/combining unit 211 is input to the error determination unit 205. If no error in the frames of the frame block is detected by the error determination unit 205, the frame block is output to the higher-layer forwarding frame buffer 209, where it is subjected to buffering such that the frame numbers is not changed with respect to the numerical order, and is then forwarded to a higher layer via the higher-layer signal processing unit 210.

On the other hand, if an error in the frame block is detected by the error determination unit 205, the frame management unit 206 records an identifier of the frame block such as a sequence number or a frame number, and stores the frame block in the frame buffer 207. The block frame stored in the frame buffer 207 is kept for a predetermined period of time until a copied frame block is received.

Then, if a copied frame block is input to the reception device 200, the frame block is input to the frame management unit 206 via the wireless input/output unit 201, the wireless access control unit 202, the wireless frame demodulation unit 203, the source determination unit 204, and the error determination unit 205, as with the previous frame block. The frame block is accumulated in the frame buffer 207 until the reception of frames necessary for error correction decoding of the frame block is complete.

Also, when the state is reached in which error correction decoding is possible, the frame management unit 206 reads the frame block from the frame buffer 207 and outputs the read frame block to the frame decoding/combining unit 211. The frame decoding/combining unit 211 then performs error correction decoding processing on the frame block. The frame block decoded by the frame decoding/combining unit 211 is output to the higher-layer forwarding frame buffer 209 if no error is detected by the error determination unit 205.

On the other hand, if an error in the frame block is detected by the error determination unit 205, the frame management unit 206 determines whether or not a frame block having the same source ID as that of the frame block is accumulated in the frame buffer 207. If there is a frame block having the same source ID in the frame buffer 207, the frame management unit 206 inputs the sequentially received frame blocks having the same source ID to the frame decoding/combining unit 211 so that the error is solved by diversity combining processing or the like. When the error has been solved by the processing for combining the frame blocks having the same source ID, the error determination unit 205 outputs the combined frame block as an errorless frame block to the higher-layer forwarding frame buffer 209.

Note that if a plurality of flows (content items) are transmitted from one source, information for specifying each of the flows is added. In this case, a transmission device stores the information for specifying the flow in a field of the frame and transmits the frame, and a reception device identifies, based on both the source and the flow, the frame block that is to be received by the reception device itself and is to be subjected to diversity combining processing.

Figure 7:
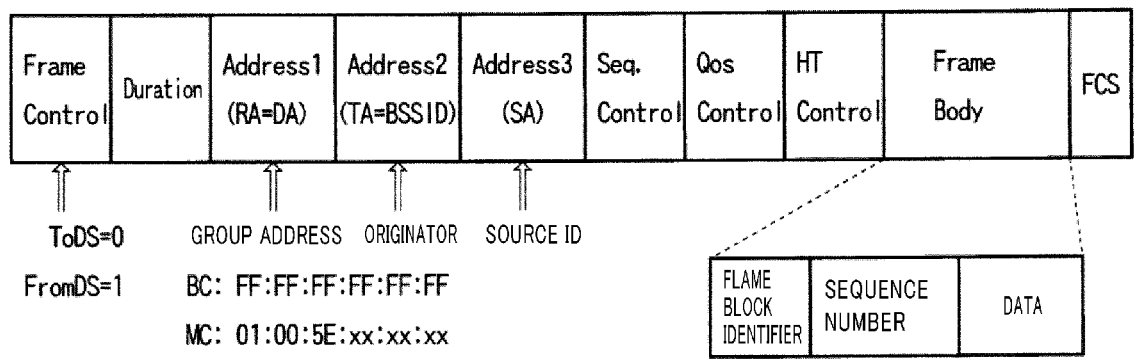
FIG. 7 is a diagram illustrating an example of a format of a wireless frame.
Figure 8:
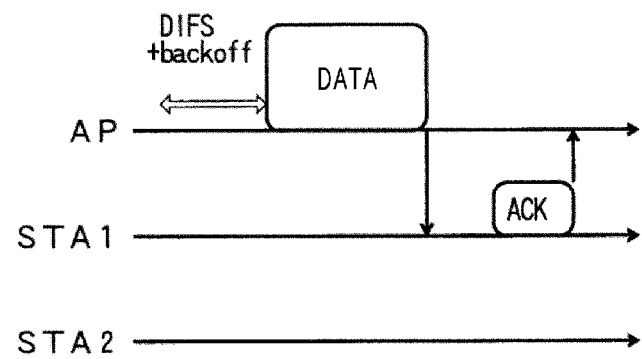
FIG. 8 is a diagram illustrating a data forwarding procedure of unicast data transmission.
Figure 9:
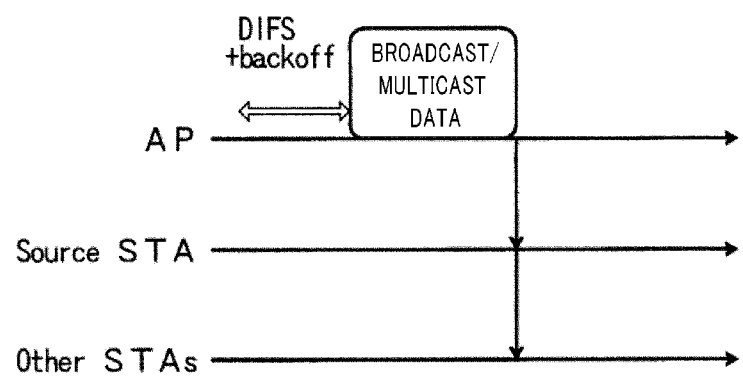
FIG. 9 is a diagram illustrating a procedure for transmitting group-addressed data (broadcast data/multicast data).

An example of a format of a wireless frame is shown in FIG. 7. In this example, a source ID (SA) is set in the Address 3 field. Also, a flow identifier (FID), a sequence number assigned for each pair of SA and FID, and data to be subjected to group-addressed transmission are set in the Frame Body field. The reception device determines whether or not a wireless frame belongs to the same group-addressed data based on SA, FID, and the sequence number thereof.

REFERENCE SIGNS LIST

10 Source
100 Transmission device
101 Input/output unit
102 Data determination unit
103 Specific source transmission queue
104 Common transmission queue
105 Wireless frame modulation unit
106 Coding unit
107 Wireless access control unit
108 Wireless modulation/demodulation unit
109 Wireless input/output unit
110 Coding/copying unit
200 Reception device
201 Wireless input/output unit
202 Wireless access control unit
203 Wireless frame demodulation unit
204 Source determination unit
205 Error determination unit
206 Frame management unit
207 Frame buffer
208 Frame decoding unit
209 Higher-layer forwarding frame buffer
210 Higher-layer signal processing unit
211 Frame decoding/combining unit

The invention claimed is:

1. A wireless communication system comprising:
a transmission device configured to receive an input of group-addressed data transmitted from a specific source, convert the group-addressed data into wireless frames, and perform group-addressed transmission of the wireless frames; and
a reception device configured to receive the wireless frames transmitted from the transmission device, and identify and acquire the group-addressed data of the specific source,
wherein
the transmission device includes a coding unit, including one or more processors, configured to define a plurality of wireless frames as a frame block, performing error correction coding on the frame block, and performing group-addressed transmission of the frame block, wherein a first identifier indicating the group-addressed data transmitted from the specific source and a second identifier indicating that error correction coding has been performed in units of frame block are added to the wireless frames, and
the reception device includes a decoding unit, including one or more processors, configured to identify the frame block from the received wireless frames, performing error correction decoding in units of frame block, and reconfiguring the group-addressed data of the specific source, wherein the reception device uses the first and second identifiers to decode the frame block and identify the group-addressed data of the specific source.

2. The wireless communication system according to claim 1, wherein the transmission device includes, in addition to the coding unit, a copying unit, including one or more processors, configured to copy the frame block subjected to the error correction coding and performing group-addressed transmission of the copy of the frame block, and
the reception device includes, in addition to the decoding unit, a combining unit, including one or more processors, configured to receive the frame block and the copy of the frame block and combining the frame block subjected to the error correction decoding and the copy of the frame block.

3. A wireless communication method comprising:
a transmission device receiving an input of group-addressed data transmitted from a specific source, converting the group-addressed data into wireless frames, and performing group-addressed transmission of the wireless frames; and
a reception device receiving the wireless frames transmitted from the transmission device, and identifying and acquiring the group-addressed data of the specific source,
wherein
the transmission device executes a coding step of defining a plurality of wireless frames as a frame block, performing error correction coding on the frame block, and performing group-addressed transmission of the frame block, wherein a first identifier indicating the group-addressed data transmitted from the specific source and a second identifier indicating that error correction coding has been performed in units of frame block are added to the wireless frames, and
the reception device executes a decoding step of identifying the frame block from the received wireless frames, performing error correction decoding in units of frame block, and reconfiguring the group-addressed data of the specific source, wherein the reception device uses the first and second identifiers to decode the frame block and identify the group-addressed data of the specific source.

4. The wireless communication method according to claim 3, wherein the transmission device executes, in addition to the coding step, a copying step of copying the frame block subjected to the error correction coding and performing group-addressed transmission of the copy of the frame block, and
the reception device executes, in addition to the decoding step, a combining step of receiving the frame block and the copy of the frame block and combining the frame block subjected to the error correction decoding and the copy of the frame block.

* * * * *